(12) United States Patent
Hockenberry et al.

(10) Patent No.: US 9,742,898 B2
(45) Date of Patent: Aug. 22, 2017

(54) MOBILE CABIN PANEL

(71) Applicant: THE BOEING COMPANY, Chicago, IL (US)

(72) Inventors: Benjamin Hockenberry, Renton, WA (US); Yi-Chin Lai, Bellevue, WA (US); Kent Pflugrath, Seattle, WA (US); Kesav Rayaprolu, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/841,392

(22) Filed: Aug. 31, 2015

(65) Prior Publication Data

US 2017/0064067 A1 Mar. 2, 2017

(51) Int. Cl.
*H04B 1/38* (2015.01)
*H04M 1/725* (2006.01)
*H04B 1/3822* (2015.01)
*B64D 13/08* (2006.01)
*B64D 11/00* (2006.01)
*B64D 13/06* (2006.01)

(52) U.S. Cl.
CPC ......... *H04M 1/72533* (2013.01); *B64D 11/00* (2013.01); *B64D 11/0015* (2013.01); *B64D 13/08* (2013.01); *H04B 1/3822* (2013.01); *B64D 2013/0655* (2013.01)

(58) Field of Classification Search
CPC . B64D 11/0015; B64D 13/00; G06F 3/04842; G06F 3/04847; G06F 9/4443
USPC .......... 455/557, 41.2, 41.1, 3.06, 427, 12.1, 455/11.1, 99; 340/945; 725/76, 71, 72, 725/73, 77, 81; 280/801.1; 701/3, 36, 701/49; 715/771; 297/217.6, 217.3, 297/217.7
See application file for complete search history.

(56) References Cited

U.S. PATENT DOCUMENTS

| | | | | |
|---|---|---|---|---|
| 6,448,907 B1* | 9/2002 | Naclerio | ................ | B64D 25/06 244/122 R |
| 8,005,580 B2* | 8/2011 | McAvoy | .................. | H02J 3/14 244/53 R |
| 8,166,506 B2* | 4/2012 | Callahan | ............ | B64D 11/0015 725/71 |
| 9,205,914 B1* | 12/2015 | Fagan | ................ | B64D 11/0015 |
| 2005/0008003 A1* | 1/2005 | Ramey | ................ | H04M 3/4938 370/352 |

(Continued)

*Primary Examiner* — Tan H Trinh
(74) *Attorney, Agent, or Firm* — Patterson + Sheridan, LLP

(57) ABSTRACT

A vehicle passenger cabin control system that includes a cabin control panel having an interface that is operable to receive control commands. The cabin control panel is operable to control at least one passenger cabin system in response to a received control command. The cabin control system includes a first wireless data interface. The control system also includes a mobile device that includes a display screen, a user interface operable to receive control commands, and a second wireless data interface to send the control commands to the cabin control panel. Control commands received by the user interface of the mobile device are transmitted by the cabin control panel by the second wireless data interface and the first wireless data interface. The cabin control panel is operable to control at least one passenger cabin system in response to a received mobile control command.

22 Claims, 7 Drawing Sheets

(56) References Cited

U.S. PATENT DOCUMENTS

| | | | | |
|---|---|---|---|---|
| 2005/0067530 A1* | 3/2005 | Schafer, Jr. | B64D 11/0015 | 244/118.5 |
| 2006/0095162 A1* | 5/2006 | Schafer | B64D 47/02 | 700/275 |
| 2007/0057576 A1* | 3/2007 | Lee | H02J 1/08 | 307/9.1 |
| 2007/0061847 A1* | 3/2007 | Callahan | B64D 11/0015 | 725/76 |
| 2008/0068220 A1* | 3/2008 | Giesa | B60R 22/48 | 340/945 |
| 2009/0108649 A1* | 4/2009 | Kneller | B64D 11/00 | 297/217.6 |
| 2009/0109036 A1* | 4/2009 | Schalla | B64D 11/0015 | 340/573.1 |
| 2009/0112377 A1* | 4/2009 | Schalla | B64D 11/0015 | 701/3 |
| 2009/0112378 A1* | 4/2009 | Robb | B64D 11/00155 | 701/3 |
| 2009/0112407 A1* | 4/2009 | Kneller | B64D 11/0015 | 701/45 |
| 2009/0132128 A1* | 5/2009 | Marriott | B60R 22/48 | 701/45 |
| 2010/0225654 A1* | 9/2010 | Theis | G06Q 30/0241 | 345/520 |
| 2013/0132548 A1* | 5/2013 | Cabos | H04L 67/16 | 709/223 |
| 2013/0218409 A1* | 8/2013 | Blain | B64D 11/0015 | 701/36 |
| 2013/0278415 A1* | 10/2013 | Morgan, Jr. | H04W 4/046 | 340/539.13 |
| 2013/0314257 A1* | 11/2013 | Macrae | G08C 17/00 | 340/971 |
| 2014/0035482 A1* | 2/2014 | Rains, Jr. | H05B 37/0254 | 315/294 |
| 2014/0085337 A1* | 3/2014 | Velten | B64D 11/0015 | 345/635 |
| 2014/0125355 A1* | 5/2014 | Grant | B64D 11/06 | 324/629 |
| 2015/0017915 A1* | 1/2015 | Hennequin | G08C 17/02 | 455/41.2 |
| 2015/0058777 A1* | 2/2015 | Graumann | G06F 9/4443 | 715/771 |
| 2015/0090839 A1* | 4/2015 | Freund | B64D 11/0015 | 244/118.5 |
| 2015/0094882 A1* | 4/2015 | Riedel | B64D 11/0015 | 701/3 |
| 2015/0154041 A1* | 6/2015 | Provis | H04L 29/0809 | 718/1 |
| 2016/0059953 A1* | 3/2016 | Fagan | B64D 11/0015 | 701/3 |
| 2016/0059954 A1* | 3/2016 | Fagan | B64D 11/00153 | 701/3 |
| 2016/0062327 A1* | 3/2016 | Fagan | G05B 15/02 | 700/83 |
| 2016/0062618 A1* | 3/2016 | Fagan | G06F 3/04847 | 715/772 |
| 2016/0081008 A1* | 3/2016 | Kuhlmann | H04B 7/18508 | 455/552.1 |
| 2016/0090192 A1* | 3/2016 | Dunn | B64D 11/0015 | 340/945 |

* cited by examiner

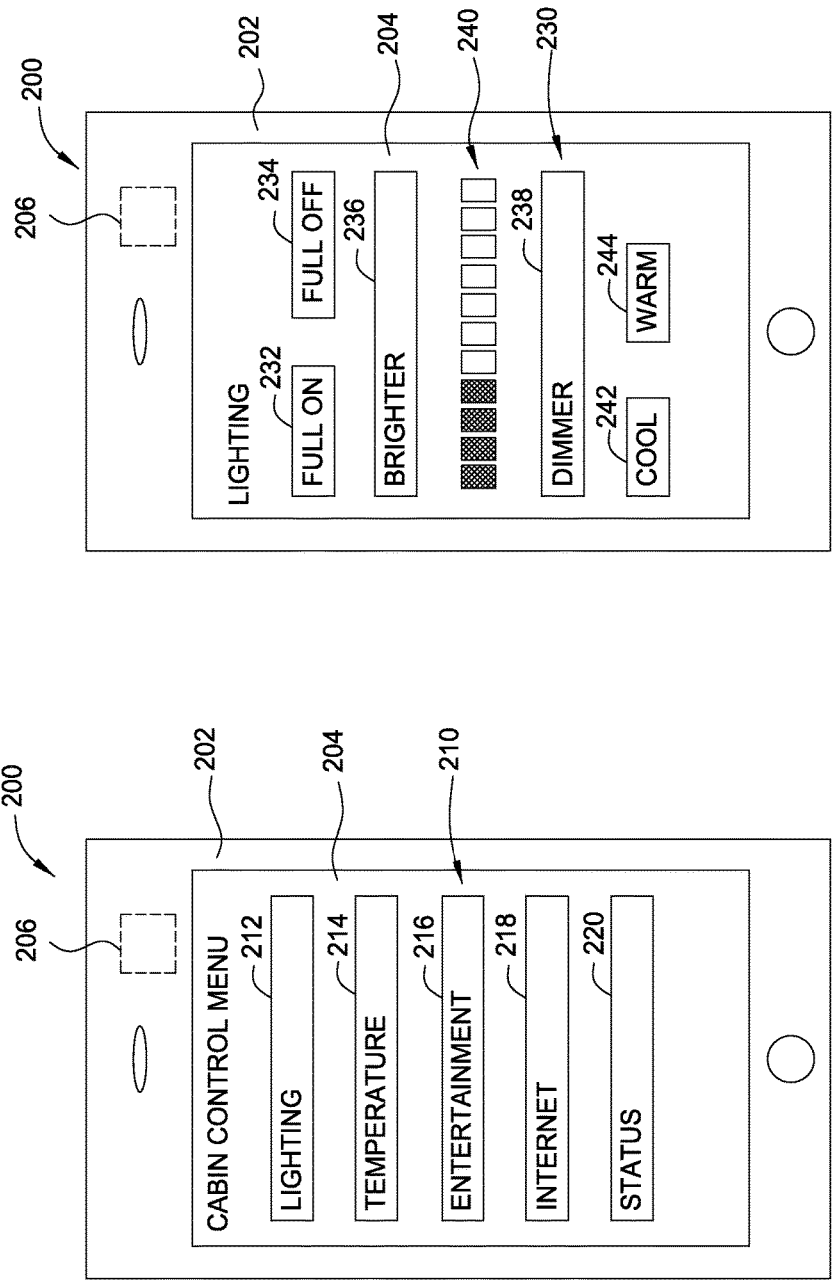

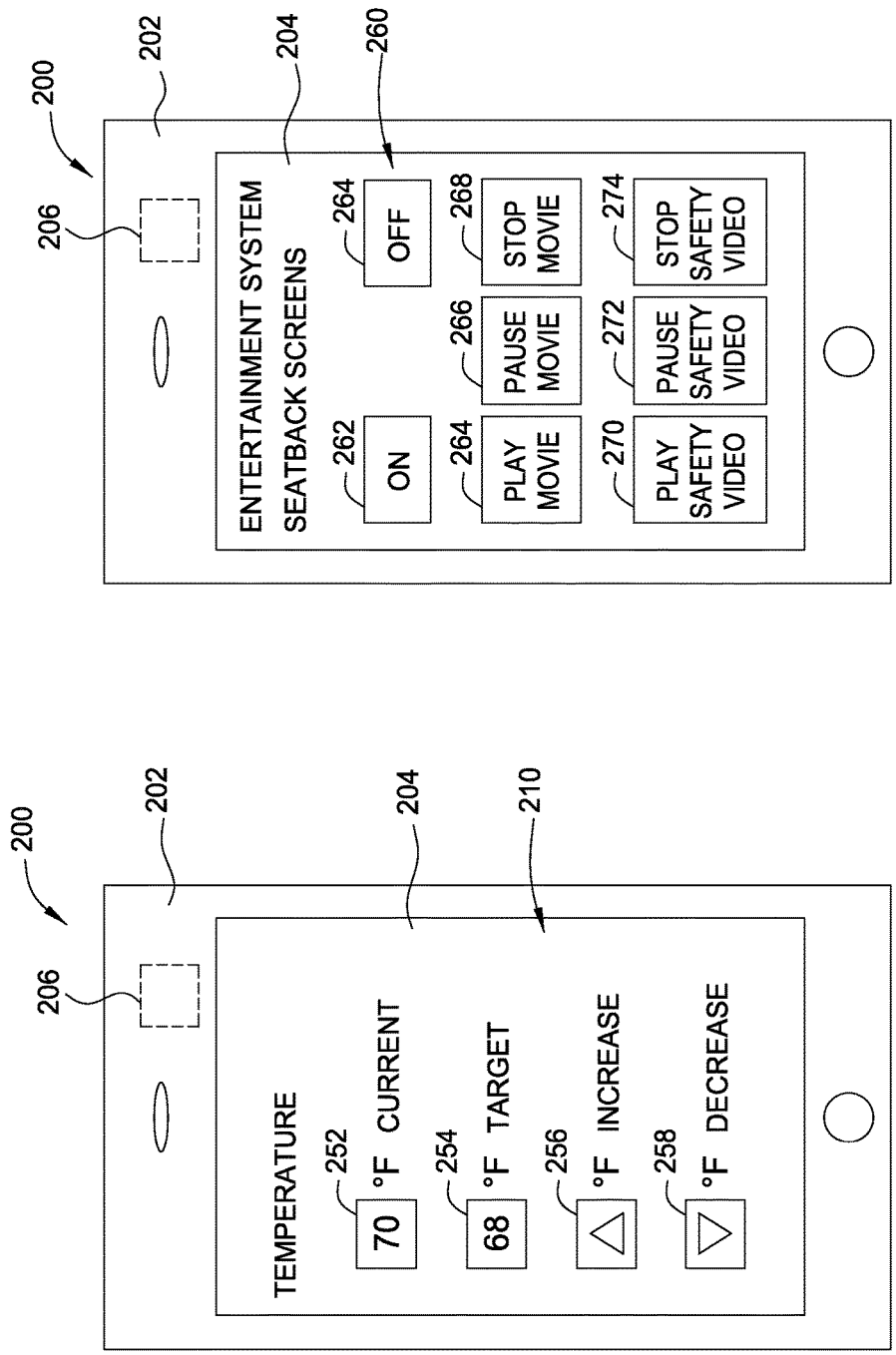

MOBILE CABIN PANEL

BACKGROUND

Aspects disclosed herein relate to vehicle passenger cabin controls, and more specifically, to a wireless interface for controlling systems in a passenger cabin of a vehicle.

SUMMARY

According to one aspect, an aircraft includes a passenger cabin. The aircraft also includes a cabin control panel that includes an interface for receiving control commands. The cabin control panel is operable to control a plurality of passenger cabin systems in response to a received control command. The aircraft also includes a wireless data interface in communication with the cabin control panel. The wireless data interface is operable to receive mobile control commands from a mobile device and transmit the mobile control commands to the cabin control panel. The cabin control panel is operable to control the plurality of passenger cabin systems in response to a received mobile control command.

According to one aspect, a mobile control device for providing control commands to a control panel for a plurality of passenger cabin systems in a vehicle passenger cabin is provided. The mobile control device includes a wireless data interface operable to communicate with a control panel for the vehicle passenger cabin. The mobile control device also includes a display screen operable to display data received from the control panel via the wireless data interface. The mobile control device also includes a user interface operable to receive control commands, wherein the data interface transmits the control commands to the control panel.

According to one aspect, a vehicle passenger cabin control system includes a cabin control panel that includes an interface that is operable to receive control commands. The cabin control panel is operable to control a plurality of passenger cabin systems in response to a received control command, wherein the cabin control system includes a first wireless data interface. The vehicle passenger cabin control system also includes a mobile device that includes a display screen, a user interface operable to receive control commands, and a second wireless data interface. Control commands received by the user interface of the mobile device are transmitted by the cabin control panel by the second wireless data interface and the first wireless data interface. The cabin control panel is operable to control the plurality of passenger cabin systems in response to received mobile control commands.

BRIEF DESCRIPTION OF THE SEVERAL VIEWS OF THE DRAWINGS

FIG. 2A is a front view of an exemplary mobile device according to at least one aspect illustrating a graphical user interface for a systems menu;

FIG. 2B is a front view of the exemplary mobile device of FIG. 2A illustrating a graphical user interface for a lighting menu;

FIG. 2C is a front view of the exemplary mobile device of FIG. 2A illustrating a graphical user interface for an air temperature menu;

FIG. 2D is a front view of the exemplary mobile device of FIG. 2A illustrating a graphical user interface for an entertainment system menu;

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

Passenger cabins of vehicles typically have a control panel with controls for various systems for the passenger cabins. Examples of such systems include lighting, climate control (i.e., environmental controls), an entertainment system (e.g., seatback screens that can play television programs, movies, or other videos), and Internet system. Such control panels can also provide status indicators for various systems, such as a potable water tank and a waste tank for a lavatory. For example, the control panel could include a first meter, gauge, or the like that indicates a fill level of a potable water tank, and a second meter, gauge, or the like that indicates a fill level of the waste tank.

Figure 1A:
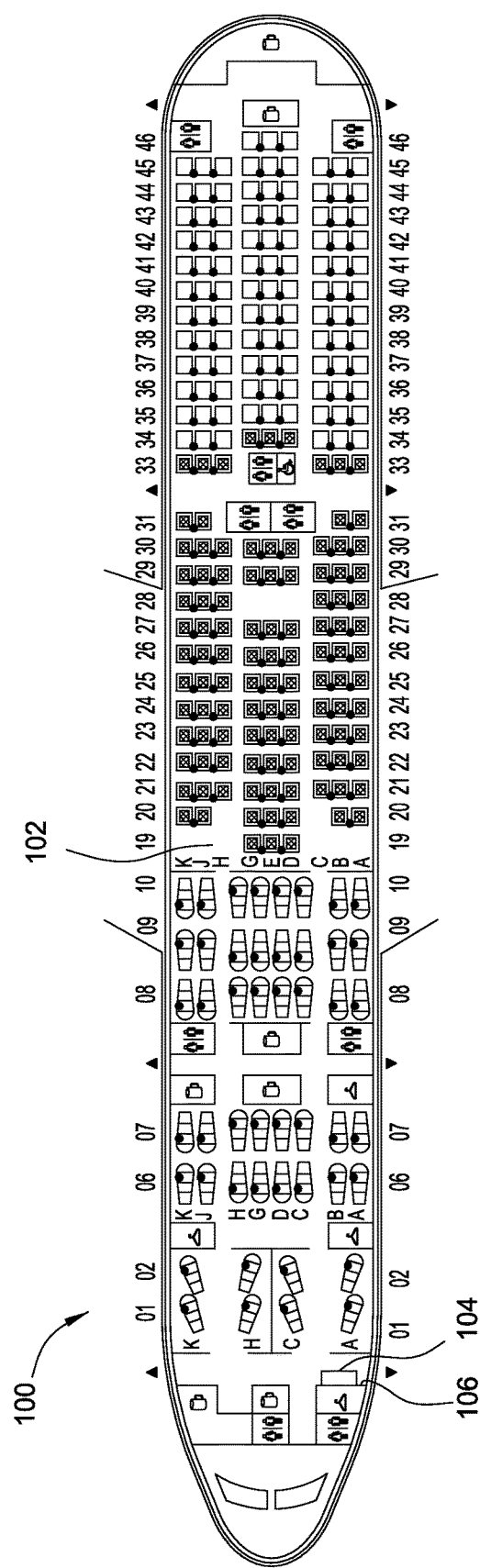
FIG. 1A is a top plan view of passenger compartment in an aircraft.
Figure 1B:
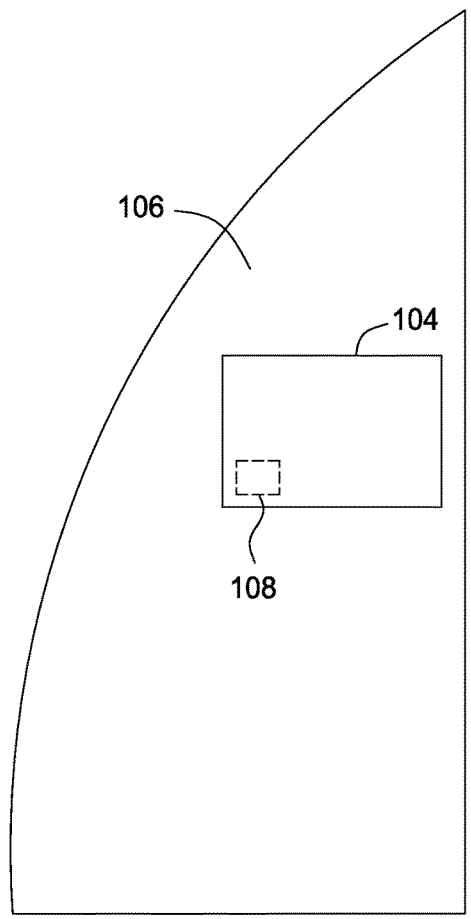
FIG. 1B is a front view of a bulkhead in the passenger compartment with a control panel for passenger compartment systems.

FIG. 1A is a top plan view of a passenger compartment 102 of an aircraft 100. The passenger compartment 102 includes seats arranged in rows with aisles passing along the rows. The passenger compartment 102 includes a bulkhead 106 with a control panel 104 arranged thereon. FIG. 1B is a front view of the bulkhead 106 with the control panel 104 arranged thereon. The control panel 104 includes or is in communication with a wireless data interface 108.

Figure 1C:
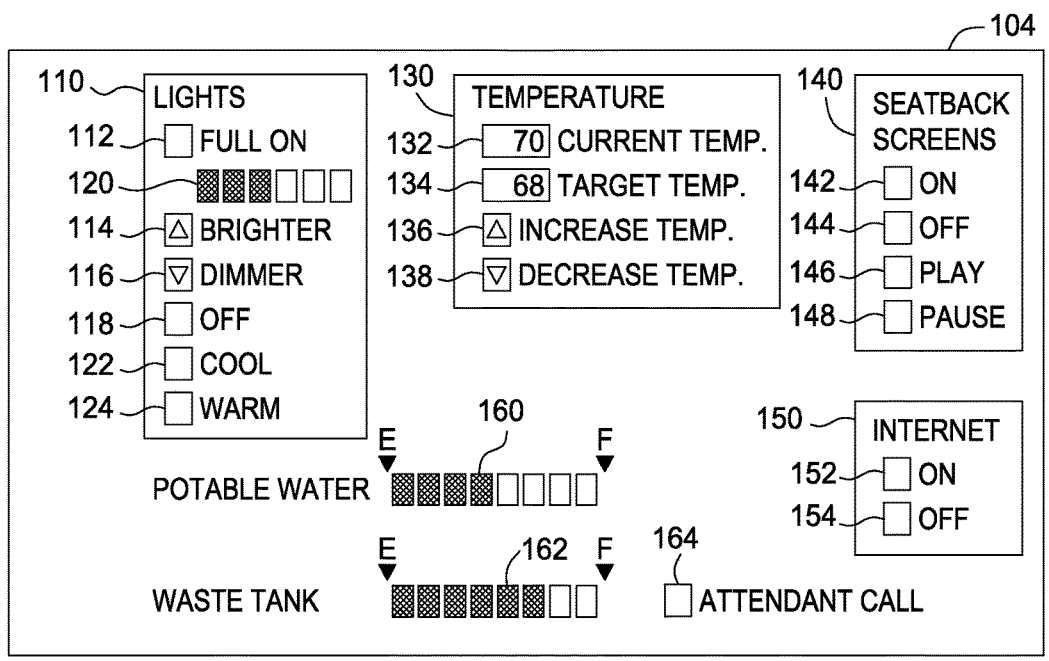
FIG. 1C is a front view of the control panel of FIG. 1B, wherein exemplary controls are illustrated in detail.

FIG. 1C illustrates a more detailed view of the control panel 104. As shown, the control panel 104 is a unitary panel in which all of the controls and/or indicators, described below, are contained in the unitary panel. In various aspects, the control panel 104 could include multiple panels, wherein each panel houses a subset of the controls and/or indicators. The control panel 104 could include physical buttons, as discussed below, or could be a touch screen display that displays icons that a user touches to control various functions. The control panel 104 includes a lighting subpanel 110 that controls a lighting system 304 (see FIG. 3) for the passenger compartment 102 of the aircraft 100. The lighting subpanel 110 includes a button 112 that causes the lights in the passenger compartment 102 to be turned on to full brightness. The lighting subpanel 110 also includes a button 118 that causes the lights in the passenger compartment 102 to turn off. The lighting subpanel 110 also includes a button 114 that causes the lighting in the passenger compartment 102 to incrementally brighten and a button 116 that causes the lighting in the passenger compartment 102 to incrementally dim. The lighting subpanel 110 also includes an indicator gauge 120 that indicates a current status of the cabin lighting. Here, the indicator gauge 120 is illustrated as a series of six light emitting diodes (LEDs) or the like arranged in a row. The indicator gauge 120 is illustrated with three of the six LEDs illuminated (shown as shaded in FIG. 1C), meaning that the lighting in the passenger compartment 102 is set to a medium brightness level. The lighting subpanel 110 also includes buttons that could cause the color of the lighting in the passenger compartment 102 to change. For example, the lighting subpanel 110 includes a button 122 that changes the lighting in the passenger compartment 102 to a cool hue (e.g., a blue color) and a button 124 that changes the lighting in the passenger compartment 102 to a warm hue (e.g., an orange or red color).

The control panel 104 also includes a temperature subpanel 130 for an environmental control system 306 (see FIG. 3) for the passenger compartment 102. The temperature subpanel 130 includes a first indicator 132 that indicates a current temperature in the passenger compartment 102 of the aircraft 100. The first indicator 132 is illustrated as indicating a current temperature of 70° F. The temperature subpanel 130 also includes a second indicator 134 that indicates a target temperature (i.e., a set temperature) in the passenger compartment 102. The second indicator 134 is illustrated as indicating a target temperature of 68° F. The temperature subpanel 130 also includes a button 136 that causes the target temperature to incrementally increase and a button 138 that causes the target temperature to incrementally decrease.

The control panel 104 also includes an entertainment system subpanel 140 that controls an entertainment system 308 (see FIG. 3) (e.g., seatback screens in the passenger compartment 102 of the aircraft 100) for the passenger compartment 102. The entertainment system subpanel 140 includes a first button 142 that provides power or otherwise turns on or activates the entertainment system. For example, pressing the first button 142 could provide power to the seatback screens and/or power to a media server that stores and transmits images and/or videos to the seatback screens. As another example, pressing the first button 142 could enable transmission of images from the media server to the seatback screens. The entertainment system subpanel 140 includes a second button 144 that turns off the entertainment system. For example, pressing the second button 144 could disable transmission of images from the media server to the seatback screens and/or remove power to the seatback screens and/or power to the media server. The entertainment system subpanel 140 also includes a button 146 that causes media to play and a button 148 that causes the media to pause or stop.

The control panel 104 also includes an Internet subpanel 150 that controls an Internet system 310 (see FIG. 3) (e.g., Gogo® inflight internet or Row44® inflight internet) for the passenger compartment 102. Newer aircraft and other vehicles are equipped with wireless Internet connectivity for passengers in many instances. For various reasons, such wireless Internet connectivity could be disconnected at various times during operation of the vehicle. For example, in an aircraft, wireless Internet connectivity is often disabled during takeoff and landing. The Internet subpanel 150 includes a first button 152 that enables wireless Internet connectivity (e.g., that provides power to the wireless Internet system) and a second button 154 that disables wireless Internet connectivity (e.g., that removes power from the wireless Internet system).

The control panel 104 also includes indicators 160 and 162 for a fill level for a potable water tank 312 (see FIG. 3) and for a fill level of the waste water tank 314 (see FIG. 3), respectively. The indicators 160 and 162 are each illustrated as a series of eight LEDs. On the illustrated control panel 104, half of the LEDs for the potable water tank indicator 160 are illuminated, meaning that the potable water tank 312 is half-full. On the illustrated control panel 104, six of the eight LEDs for the waste water tank 162 are illuminated, meaning that the waste water tank 314 is three quarters full.

The control panel 104 also includes an attendant call indicator 164. The attendant call indicator 164 may simply be a light that is illuminated if a passenger pushes a button to call for a flight attendant or other vehicle attendant. For example, the passenger compartment 102 of the aircraft 100 could include attendant call buttons associated with each seat (e.g., a button on an armrest) or an attendant call button associated with a grouping of seats. For example, referring to FIG. 1A, seats 21A, 21B, and 21C could share a single attendant call button arranged on an overhead panel above the seats. When an attendant call button is pushed, the attendant call indicator 164 on the control panel 104 illuminates. Additionally, a chime may be broadcast in the passenger compartment 102 to alert the flight attendants that an attendant call button has been pushed.

The control panel 104 has been described with respect to various functions for the purposes of illustration. A person having ordinary skill in the art will understand that the control panel 104 could also control other functions not described herein.

While the control panel 104 provides a single access point for the various system controls, a cabin crew member goes to the control panel 104 to check on and/or change any settings of the various systems. Referring again to FIG. 1A, certain aircraft have very large cabins and the cabin crewmembers may walk a significant distance to reach the control panel 104. Furthermore, passengers or other obstructions, such as beverage carts, could impede cabin attendants from traveling through the passenger compartment 102 to reach the control panel 104.

In various aspects, the control panel 104 includes and/or be in communication with the wireless data interface 108. For example, the wireless data interface 108 could be housed within the control panel 104. Alternatively, the wireless data interface 108 could be located remotely from the control panel 104 and connected to the control panel 104 via a data cable (e.g., a CAT5 cable or similar cable). The wireless data interface 108 can communicate with a wireless data interface 206 (see FIG. 2A) of a mobile device 200 (see FIG. 2A)

carried by a cabin attendant. The wireless data interface 108 can transmit system status information to the mobile device 200 and/or can receive control commands from the mobile device related to the various systems. The wireless data interfaces 108 and 206 enable the cabin attendant to control the various systems and/or to check the status of the various systems from the mobile device 200 anywhere within the passenger compartment 102 of the aircraft 100.

FIG. 2A illustrates an example of a mobile device 200 according to at least one aspect. As described herein, the mobile device 200 is a tablet (e.g., an iPad, iPod, or the like) with a touch screen display 204 disposed in a housing 202. The touchscreen display 204 displays a graphical user interface that defines regions of the touchscreen display 204 that an operator (e.g., a cabin attendant) can touch to provide control commands. In various aspects, the mobile device 200 could include hard keys and/or softkeys that are dedicated to and/or assigned to generate particular control commands. The mobile device 200 also includes the wireless data interface 206 that can communicate with the wireless data interface 108 of the control panel 104. The wireless data interfaces 108 and 206 can communicate using any known wireless protocols, such as Wi-Fi, cellular data protocols, Bluetooth, and infrared. The mobile device 200 and the control panel 104 can communicate over the wireless data interfaces 108 and 206 using an application program interface (API). The API can be used to add additional control capabilities and/or status monitoring capabilities as additional systems are added to the aircraft 100 or other vehicle. For example, if a loudspeaker system is later installed in the passenger compartment 102 to play background music, a control interface for the loudspeaker system could be implemented using the API. As a result, the wireless data interfaces 108 and 206 would remain the same, and only the software on the mobile device running the API would be modified.

Figure 2F:
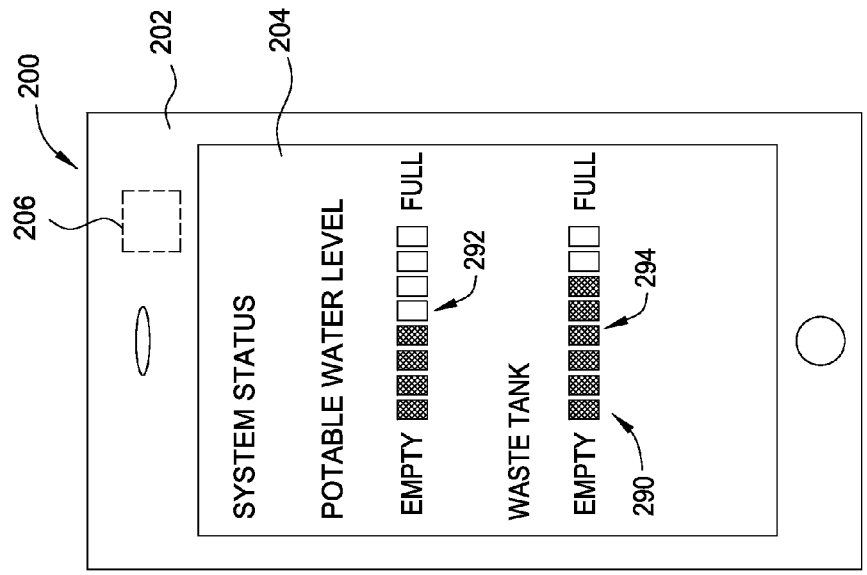
FIG. 2F is a front view of the exemplary mobile device of FIG. 2A illustrating a graphical user interface for a systems status display.

FIGS. 2A-2G illustrate various graphical user interface screen views for controlling systems in the passenger compartment 102 of the aircraft 100. FIG. 2A illustrates a graphical user interface 210 for a main menu screen from which the user can select which system to control and/or monitor. The graphical user interface 210 includes five user-selectable icons. A first icon 212 can be selected to access a lighting graphical user interface 230 (shown in FIG. 2B) for the lighting system 304. A second icon 214 can be selected to access a temperature graphical user interface 250 (shown in FIG. 2C) for the environmental control system 306. A third icon 216 can be selected to access an entertainment system graphical user interface 260 (shown in FIG. 2D) for the entertainment system 308. A fourth icon 218 can be selected to access an Internet system graphical user interface 280 (shown in FIG. 2E) for the Internet system 310. A fifth icon 220 can be selected to access a system status graphical user interface 290 (shown in FIG. 2F).

With reference to FIG. 2B, upon the user selecting the lighting icon 212 (i.e., touching the touchscreen display 204 within the region bounded by the lighting icon 212), the mobile device 200 displays the lighting graphical user interface 230 on the display screen 204. The lighting graphical user interface 230 includes a first icon 232 that can be selected to turn the cabin lighting on to a full brightness level. For example, the passenger compartment 102 of the aircraft 100 could have overhead ambient lights in addition to individual reading lights associated with each seat. Selecting the first icon 232 could turn the overhead ambient lights on to a full brightness level and/or could turn on the individual reading lights on to a full brightness level. For example, upon a user touching the displayed first icon 232, the mobile device 200 could communicate a control command to the control panel 104 via the wireless data interfaces 206 and 108. The control panel 104 could then output a control command to the lighting system to turn on the overhead ambient lighting to full brightness.

The lighting graphical user interface 230 further includes a second icon 234 that can be selected to turn the cabin lights off. For example, selecting the second icon 234 could turn the overhead ambient lights off and/or could turn off any individual reading lights. For example, upon the user selecting the second icon 234, the mobile device 200 could communicate control commands to the control panel 104 via the wireless data interfaces 206 and 108. The control panel 104 could then communicate control commands to the lighting system to turn the overhead ambient lighting off.

The lighting graphical user interface 230 further includes a third icon 236 that can be selected to incrementally increase the brightness of the overhead ambient lights and a fourth icon 238 that can be used to incrementally decrease the brightness of the overhead ambient lights. The lighting graphical user interface 230 includes a status indicator 240 for the brightness of the ambient lights. Here, the status indicator is depicted as a series of nine rectangular icons arranged in a row, and the first four icons are illuminated (i.e., shaded in the Figure), meaning that the lights are turned on and illuminated to slightly less than half of the maximum brightness level. In the event a user selects the third icon 236 to incrementally increase the brightness of the overhead ambient lighting, the mobile device 200 communicate control commands to the control panel 104 via the wireless data interfaces 206 and 108. The control panel 104 could then output control commands to the lighting system 304 to increase the brightness of the overhead ambient lighting. In response to the overhead ambient lighting increasing in brightness, the indicator gauge 120 on the control panel 104 changes to indicate the new brightness level. The control panel 104 could also communicate to the mobile device 200, via the wireless data interfaces 108 and 206, data related to the brightness of the overhead ambient lighting. For example, the control panel 104 can send data that indicates the brightness of the overhead ambient lighting represented by a number of the rectangular icons of the status indicator 240 of lighting graphical user interface to fill. The status indicator 240 on the lighting graphical user interface 230 changes to indicate the new brightness level.

In the event a user selects the fourth icon 238 to incrementally decrease the brightness of the overhead ambient lighting, the mobile device 200 communicates control commands to the control panel 104 via the wireless data interfaces 206 and 108. The control panel 104 could then output control commands to the lighting system to decrease the brightness of the overhead ambient lighting. In response to the overhead ambient lighting increasing in brightness, the indicator gauge 120 on the control panel 104 could change to indicate the new brightness level. The control panel 104 could also communicate to the mobile device, via the wireless data interfaces 108 and 206, data related to the brightness of the overhead ambient lighting. For example, the control panel 104 can communicate data that indicates the brightness of the overhead ambient lighting represented by a number of the rectangular icons of the status indicator 240 of lighting graphical user interface to fill.

The lighting graphical user interface 230 can also include a fifth icon 242 that can be selected to change the color of the lighting to a cool hue and a sixth icon 244 that can be selected to change the color of the lighting to a warm hue.

For example, upon a user selecting the fifth icon 242, the mobile device 200 could communicate a control command to the control panel 104 via the wireless data interfaces 206 and 108. The control panel 104 could then send control signals to the lighting system to change the hue of the lighting to a cool (e.g., blue) color. The control panel 104 can also communicate a status indicator to the mobile device 200 via the wireless data interfaces 108 and 206. The status indicator could cause the change to the lighting graphical user interface 230 to indicate that the lighting color has been changed. For example, the fifth icon 242 could change color, could change size or shape, or could change in brightness. As another example, upon a user selecting the sixth icon 244, the mobile device 200 could communicate control commands to the control panel 104 via the wireless data interfaces 206 and 108. The control panel 104 could then send control signals to the lighting system to change the hue to a warm color (e.g., an orange or red color). The control panel 104 could also send a status indicator to the mobile device 200 via the wireless data interfaces 108 and 206. The status indicator can cause a change to the lighting graphical user interface 230 to indicate the lighting color has been changed. For example, the sixth icon 244 could change color, could change size or shape, or could change in brightness.

FIG. 2C illustrates the temperature graphical user interface 250. The temperature graphical user interface 250 includes a first field 252 that displays a status indication for the current air temperature in the passenger compartment 102 of the aircraft 100. For example, the control panel 104 could receive a temperature indication from a temperature sensor in the passenger compartment 102. The control panel 104 could communicate the temperature indication to the mobile device via the wireless data interfaces 108 and 206. The mobile device 200 could then display the temperature indication in the first field 252. The temperature graphical user interface 250 also includes a second field 254 that displays a status indication for a target air temperature in the passenger compartment 102 of the aircraft 100. For example, a target temperature could be set using the control panel 104 (via the buttons 136 and/or 138) and communicate a corresponding target temperature indication to the mobile device 200 via the wireless data interfaces 108 and 206. The mobile device 200 could then display the indication in the second field 254.

The temperature graphical user interface 250 also includes a first icon 256 and a second icon 258 that can be selected (i.e., touched) to increase or decrease the target air temperature, respectively. Upon the first icon 256 or the second icon 258 being touched, the mobile device 200 communicates a control command to the control panel 104 via the wireless data interfaces 206 and 108. The control panel 104, in turn, increases or decreases the target temperature. The mobile device 200 also changes the indicated target temperature in the second field 254 to reflect the target temperature after the first icon 256 or the second icon 258 is touched. The mobile device 200 can periodically query the control panel 104, via the wireless data interfaces 206 and 108, to receive an up-to-date current temperature (for display in the first field 252) and an up-to-date target temperature (for display in the second field 254). For example, the mobile device 200 could query the control panel 104 once per minute, once per second, once every five minutes, or at any other suitable interval.

FIG. 2D illustrates the entertainment system graphical user interface 260 on the touchscreen display 204 of the mobile device 200 for controlling the entertainment system 308 for the passenger compartment 102. The entertainment system graphical user interface 260 includes a first icon 262 to power seatback display screens in the passenger compartment 102 of the aircraft, for example. The entertainment system graphical user interface 260 includes a second icon 264 that turns the seatback displays off. In the event the first icon is touched, the mobile device 200 communicates control commands to the control panel 104 via the wireless data interfaces 206 and 108. The control panel 104, in turn, sends control commands to the entertainment system 308 which controls power to the seatback display screens. The entertainment system 308 can then provide power to the seatback display screens. In the event the second icon is touched, the mobile device 200 communicates control commands to the control panel 104 via the wireless data interfaces 206 and 108. The control panel 104, in turn, sends the control commands to the entertainment system 308. The entertainment system 308 then removes power from the seatback display screens. The entertainment system graphical user interface 260 also includes icons for playing a movie (or television program or the like) 264, for pausing the movie 266, and for stopping the movie 268. In various aspects, the entertainment system graphical user interface 260 could include other icons for controlling playback of media, such as rewind, fast forward, skip backwards, and skip forwards.

In various aspects, the entertainment system graphical user interface 260 could also include icons that allow a user to select media for display. Pressing such an icon could result in the mobile device 200 displaying on the display screen 204 a sub menu of the entertainment system graphical user interface 260 that includes icons representing different selectable media, for example. In the event the user presses one of the icons (e.g., icons 264, 266, or 268), the mobile device 200 communicates control commands to the control panel 104 via the wireless data interfaces 206 and 108. The control panel 104 in turn transmits command signals to the entertainment system 308 to play, pause, or stop the media (or perform another playback or selected action related to the media).

In various aspects, the vehicle could include prerecorded safety videos or other informational videos. In such aspects, the entertainment system graphical user interface 260 could include icons 270, 272, and 274 to play, pause, or stop, respectively, the safety video or other informational video. In the event the user presses one of the icons 270, 272, or 274, the mobile device 200 communicates control commands to the control panel 104 via the wireless data interfaces 206 and 108. The control panel 104 in turn transmits the command signals to the entertainment system to play, pause, or stop the safety video or other informational video.

Figure 2E:
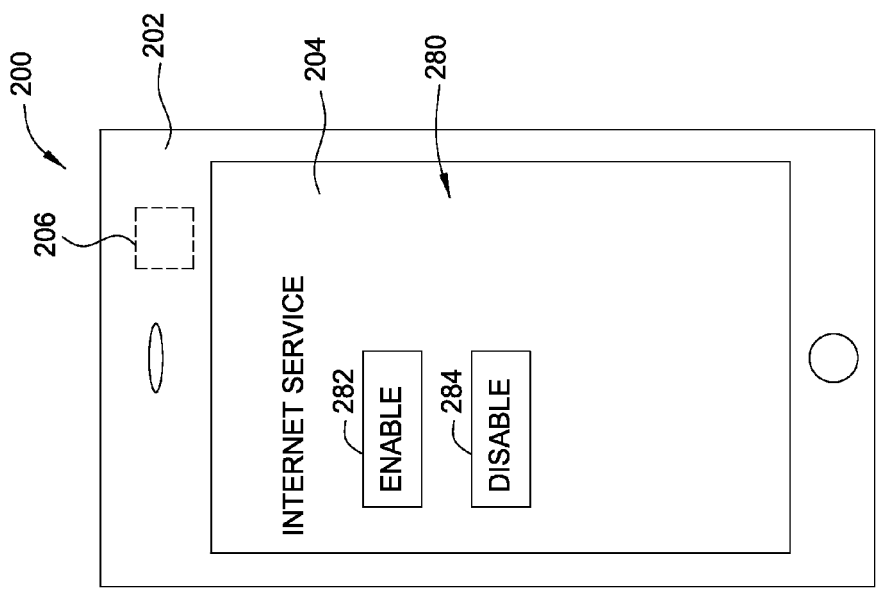
FIG. 2E is a front view of the exemplary mobile device of FIG. 2A illustrating a graphical user interface for an Internet system menu.

FIG. 2E illustrates the Internet system graphical user interface 280 on the mobile device 200 for controlling the internet system 310 for the passenger compartment 104. The Internet system graphical user interface 280 includes an enable icon 282 and a disable icon 284. In the event a user presses the enable icon 282, the mobile device 200 communicates control commands to the control panel 104 via the wireless data interfaces 206 and 108. The control panel 104 in turn transmits the commands signals to the Internet system to enable Internet access in the passenger cabin. For example, the Internet system could activate various wireless antennae that passengers can connect to using their wireless devices (e.g., laptops, tablet computers, and smartphones) to the Internet system 310 for the passenger compartment 104. As another example, the control commands from the control panel 104 could cause power to be supplied to the Internet system 310. In the event a user presses the disable icon 284, the mobile device 200 communicates control commands to the control panel 104 via the wireless data interfaces 206 and 108. The control panel 104, in turn, transmits the command signals to the Internet system to disable the Internet system 310. For example, the Internet system 310 could deactivate the wireless antennae. As another example, the control commands from the control panel 104 could cause power to be removed from the Internet system 310.

FIG. 2F illustrates the system status graphical user interface 290 on the mobile device 200. The system status graphical user interface 290 includes a first indicator 292 for the potable water level in a potable water tank 312 and a second indicator 294 of a waste water level in a waste water tank 314. The first indicator 292 is illustrated as a row of eight rectangular icons and the second indicator 294 is illustrated as a row of eight rectangular icons. A first end of the array of rectangular icons of the first indicator 292 includes the word "empty" and an opposite end of the array includes the word "full." A first end of the array of rectangular icons of the second indicator 294 includes the word "empty" and an opposite end of the array includes the word "full." The first indicator 292 is illustrated with half of the rectangular icons filled in, whereas the remaining half of the rectangular icons only show a line that defines an exterior profile of the rectangle, meaning that the potable water level of the potable water tank is half-full. The second indicator 294 is illustrated with six of eight rectangular icons filled in, whereas the remaining two of the rectangular icons only show lines defining exterior profiles of the rectangles, meaning that the waste tank level of the waste tank is three quarters full. In various aspects, the first indicator 292, the second indicator 294, and any other indicators could be illustrated or displayed as dials, bars, or the like. In various aspects, the system status could include other types of indications, such as a level of coffee in a coffee pot, a temperature of hot water, or the like. In various aspects, the system status could include other types of indications, such as the amount of time that a lavatory door has been locked.

In various aspects, the mobile device 200 can continuously or periodically query the control panel 104, via the wireless data interfaces 206 and 108, to determine the status as of the various systems. For example, the mobile device 200 could query the control panel 104 once per minute, once every 5 minutes, or once every 15 minutes. In the event the control panel 104 receives a query from the mobile device 200, the control panel 104 can scan the various systems to determine the respective status and then transmit data related to the determined status to the mobile device 200 via the wireless data interfaces 108 and 206. In various aspects, the control panel 104 periodically pushes status data to the mobile device 200 via the wireless data interfaces 108 and 206. For example, the control panel 104 could push the status data to the mobile device 200 at scheduled intervals, such as every five minutes, or whenever a status of a system changes. The control panel 104 could periodically scan the various systems to determine the statuses of the various systems and communicate data related to the statuses to the mobile device 200 via the wireless data interfaces 108 and 206. The mobile device 200 stores the data related to the status. Upon a user selecting the system status graphical user interface 290, the mobile device 200 retrieves the stored data related to the status and generates the system status indicators (e.g., status indicators 292 and 294) for display on the display screen 204 based on the retrieved data. In the event the control panel 104 transmits updated data related to status of various systems to the mobile device, the updated data can overwrite or otherwise replace older data stored in the mobile device.

In various aspects, the mobile device 200 could include preset limits for various systems status. In the event that a particular limit is exceeded, the mobile device 200 could output an audible and/or tactile alert. For example, if the potable water level indicator 292 indicates a potable water level of less than one quarter of a tank, the mobile device 200 could beep and/or vibrate to get the attention of a user. The mobile device 200 could also automatically display the system status graphical user interface 290 in the event of such an alert.

Figure 2G:
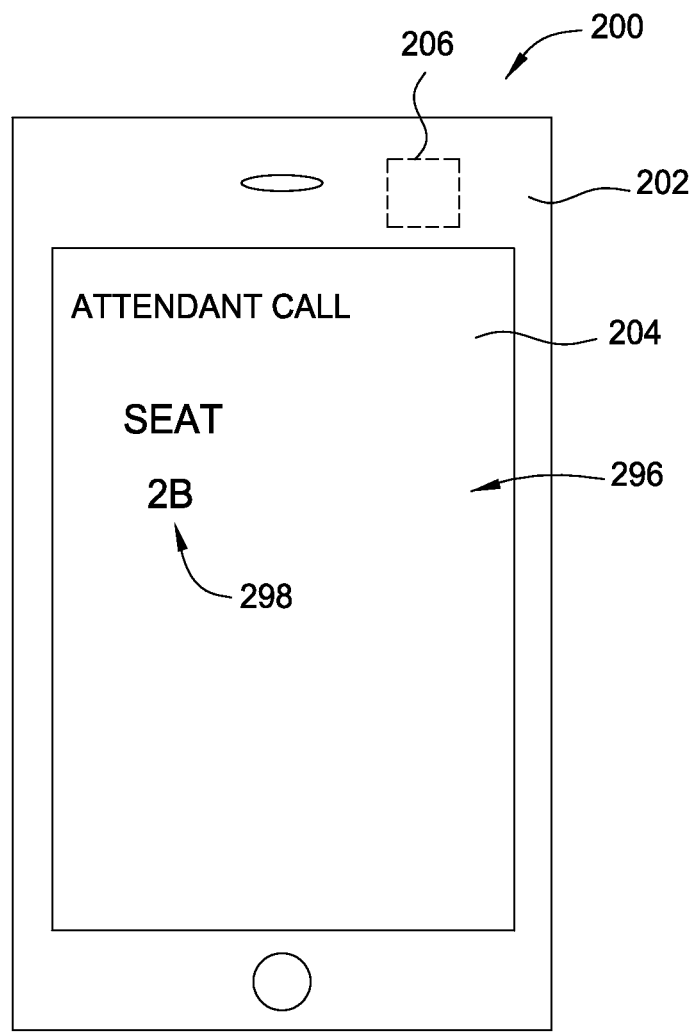
FIG. 2G is a front view of the exemplary mobile device of FIG. 2A illustrating a graphical user interface for a cabin attendant call button notification display.

In various aspects, the mobile device 200 can receive indications of an attendant call button being pushed. Typically, in a commercial aircraft, passenger seats are equipped with attendant call buttons that passengers can use to get the attention of a flight attendant. In the event a passenger pushes a button, the button or another light proximate to the passenger illuminates and an audible chime is played in the passenger cabin. The chime is intended to notify the flight attendants that an attendant call button has been pressed and the light directs the flight attendants to the passenger in need of assistance. In various aspects, when a passenger presses a cabin attendant button, a notification could be sent to the mobile device 200. The attendant call button notification on the mobile device 200 could replace or supplement the audible chime and visible light. FIG. 2G illustrates an attendant call button graphical user interface 296 on the display screen 204 of the mobile device 200. Upon a passenger pressing an attendant call button, the control panel 104 records the button press. The control panel 104 can identify which button was pressed (e.g., the attendant call button associated with row 12, seats A-C, or the attendant call button associated with seat 2B). The control panel 104 can then communicate the identification of the seat or row of the pressed attendant call button to the mobile device 200 via the wireless data interfaces 108 and 206. For example, in the event a passenger in seat 2B in the passenger compartment 102 presses an attendant call button associated with the seat, the control panel 104 receives an indication of that button being pressed. The control panel 104 then communicates an identification of the seat or seats associated with the call button to the mobile device 200 via the wireless data interfaces 108 and 206. The attendant call button graphical interface 296 displays a seat indication 298 to identify the seat associated with the pressed attendant call button. Continuing the example above, the illustrated attendant call button graphical user interface 296 is indicating that the attendant call button associated with seat 2B has been pressed. When the mobile device 200 receives the identification of the seat or seats associated with the pressed attendant call button, the mobile device 200 provides an audible or tactile indication to the mobile device to alert a user. For example, the mobile device 200 could emit a sound, such as a beep or chime, and/or could vibrate. Such a sound and/or vibration could alert the user to look at the device to address the pressed attendant call button. The mobile device 200 also could automatically display the attendant call button graphical interface 296 for a period of time (e.g., one minute) after the mobile device 200 provides the alert.

Figure 3:
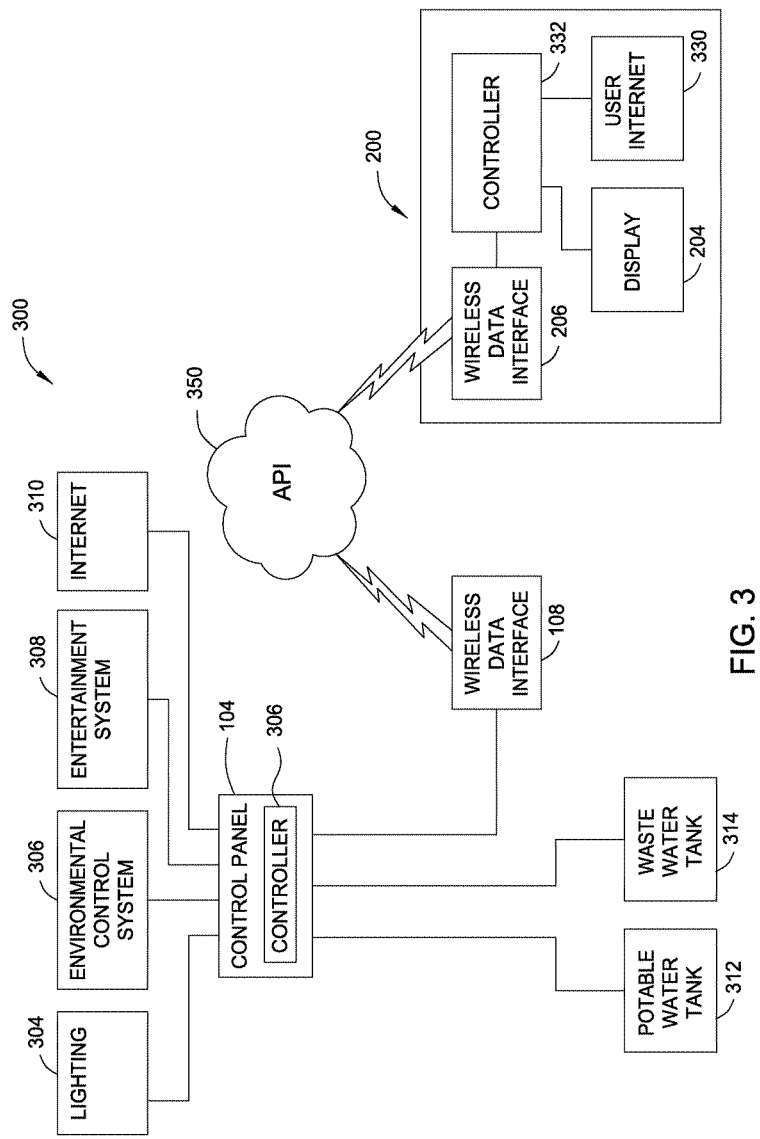
FIG. 3 is a block diagram illustrating an exemplary system, according to at least one aspect, of a vehicle systems control panel in communication with a wireless mobile device.

FIG. 3 is a block diagram for a system 300 that includes the control panel 104 and the mobile device 200. In various aspects, the control panel 104 includes a controller 306. The controller 306 is connected to the lighting system 304, the environmental control system 306, the entertainment system 308, and the Internet system 310. The controller 306 can send control signals to the lighting system 304, the environmental control system 306, the entertainment system 308, and the Internet system 310, as described above with reference to FIGS. 2A-2G. The controller 306 is also in communication with the potable water tank 312 that the waste water tank 314. The controller 306 can periodically or continuously query for and/or receive status updates from the potable water tank 312 and the waste water tank 314 and display the received status updates on the control panel 104. The various systems illustrated in FIG. 3 are merely examples. Different vehicle control systems could have additional and/or different systems that require control and/or receive status monitoring.

In use, a user inputs a command (e.g., increase the brightness of the lights or decrease the air temperature) using the control panel 104. The controller 306 converts the user command inputs on the control panel 104 to control signals that are transmitted to the various systems. For example, upon a cabin attendant or other user pressing the button 114 on the control panel 104 to increase the brightness of the lighting in the passenger compartment 102, the controller 306 sends a particular signal to the cabin lighting system 304 that causes the lighting to increase in brightness. For example, the controller 306 could transmit an electrical signal at a particular voltage or frequency to a controller of the lighting system, and the lighting system responds to the transmitted signal by increasing the brightness. In various aspects, the controller 306 could transmit digital signals to indicate different commands to different systems.

The potable water tank 312 and the waste water tank 314 transmit status information to the controller 306. The controller 306 can convert the received status information to indications for the potable water tank level indicator 160 and the waste tank level indicator 162. The indications can be transmitted to the potable water tank level indicator 160 and the waste tank level indicator 162 on the control panel 104 for display. This information can also be transmitted to a connected mobile device 200.

FIG. 3 also illustrates systems of the mobile device 200, including the display screen 204 and the wireless data interface 206, discussed above with reference to FIGS. 2A-2G. The mobile device also includes a user interface 330. In various aspects, the display screen 204 could be a touch screen display and the user interface 330 could be a graphical user interface displayed on the touch screen display such that a user interacts with the user interface 330 by touching icons or other graphical elements displayed on the touch screen display. In various aspects, the user interface 330 could include buttons, switches, or like devices arranged on the mobile device 200 that a user can manipulate to provide various control commands. The display 204 and the user interface 330 are in communication with a mobile device controller 332. The mobile device controller 332 can output to the display screen 204 the graphical user interface (e.g., the graphical user interfaces discussed above with reference to FIGS. 2A-2G). The mobile device controller 332 can transmit control commands from the user interface 330 to the controller 306 of the control panel 104 via the wireless data interfaces 206 and 108. Similarly, the mobile device controller 332 can receive from the controller 306 on the control panel 104, via wireless data interfaces 108 and 206, system statuses (e.g., system statuses from the potable water tank 312 and the waste water tank 314). The mobile device controller 332 then outputs the received system status for display on the display screen 204.

In various aspects, the wireless data interfaces 108 and 206 communicate with each other using an application program interface (API) 350. The API 350 is depicted in FIG. 3 as being between the wireless data interfaces 108 and 206. In various aspects, the API 350 could be resident in the mobile device 200 and/or in the control panel 104 or controller 306. The API 350 can format data transferred from the control panel 104 and the controller 306 for use by the mobile device 200 and can format data transferred from the mobile device 200 for use by the control panel 104 and the controller 306. For example, upon a user touching the "brighter" icon 236 on the display screen 204 (see FIG. 2B), the mobile device 200 could output a mobile control command via the wireless data interface 206. The mobile control command 200 is received by the wireless data interface 108 associated with the control panel 104 and the API 350 could translate and/or format the mobile control command into a control command that is usable by the control panel 104 and/or the controller 306. As another example, the control panel 104 and controller 306 could receive a system status indication (e.g., a fill level of the potable water tank 312) in a first format. The API 350 could translate and/or format the system status indication into a mobile system status indication that is usable by the mobile device 200, and the wireless data interface 108 associated with the control panel 104 could transmit the mobile system status indication to the wireless data interface 206 associated with the mobile device 200.

In various aspects, the API 350 defines a protocol that can be used to add control of additional systems and/or functions to the mobile device 200. For example, the API 350 could define a number of preset messages that can be assigned to different control commands and/or system status indications. For example, the API 350 could use an eight bit register that would have a total of 256 assignable messages that can be communicated via the wireless data interfaces 108 and 206. The assignable messages could be different for the mobile device 200 and for the control panel 104 and controller 306. For example, on the mobile device 200, a first message of "00000001" could be assigned to a control command to incrementally increase the set point for the air temperature and a second message of "00000010" could be assigned to a control command to incrementally decrease the set point for the air temperature. When a user presses the icon 236 on the lighting graphical user interface 230 to incrementally increase the brightness of the cabin lighting, the API 350 resident in the mobile device 200 could output, via the wireless data interface 206, the first message "00000001" assigned to the control command. The wireless data interface 108 of the control panel 104 receives the first message. In the API 350 resident in the control panel 104 and controller 306, the first message is assigned to a control command that is transmitted to the lighting system to incrementally increase the brightness of the lights. Thus, when the control panel 104 receives the first message via the wireless data interface 108, the API 350 resident in the control panel 104 outputs the control command assigned to the first message to cause the set temperature to be incrementally increased. As another example, a series of the messages in the API 350 could be used to communicate a system status. For example, a third message "00001111" could be assigned to a potable water tank fill level of "empty," a fourth message "00011111" could be assigned to a potable water tank fill level of "one eighth full," a fifth message "00101111" could be assigned to a potable water tank fill level of "one quarter full," and so on.

In various aspects, some of the messages in the API 350 can be unassigned and reserved for future systems and/or functions that could be added and/or implemented at a later date. In the event that a new system is added to the passenger cabin, the control commands used by the control panel 104 and controller 306 to control the new system could be assigned to some of the reserved messages in the API 350. Similarly, graphical user interfaces to control the new system(s) and/or functions could be added to the mobile device, and outputs from the graphical user interfaces could be similarly assigned to the reserved messages in the API 350. By reserving some of the messages in the API 350 and allowing for later assignment, the API 350 messages transmitted via the wireless data interfaces 108 and 206 remain unchanged. By maintaining the functionality of the API 350 across the wireless data interfaces 108 and 206, the API 350 and wireless data interfaces may not require additional certification or recertification when new systems and/or functions are added to the passenger cabin.

As discussed above, in various aspects, the control panel 104 and the mobile device 200 could control other systems or monitor the status of additional systems. For example, the control panel 104 could receive status information from various aircraft doors. The status information could indicate whether the doors are open, closed, locked, or unlocked. The status information could also indicate whether emergency slides attached to the doors are armed or unarmed. The control panel 104 could communicate the status information for the doors to the mobile device 200 via the wireless data interfaces 108 and 206.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects may take the form of an entirely hardware aspect, an entirely software aspect (including firmware, resident software, micro-code, etc.) or an aspect combining software and hardware aspects that may all generally be referred to herein as a "circuit," "module" or "system."

Aspects may be a system, a method, and/or a computer program product. The computer program product may include a computer readable storage medium (or media) having computer readable program instructions thereon for causing a processor to carry out aspects.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet system Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects.

Aspects are described herein with reference to flowchart illustrations and/or block diagrams of methods, apparatus (systems), and computer program products according to aspects. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to aspects, other and further aspects may be devised without departing from the basic scope thereof, and the scope thereof is determined by the claims that follow.

What is claimed is:

1. An aircraft, comprising:
a passenger cabin, including a plurality of seat status indicators arranged therein;
a cabin control panel that includes an interface for receiving control commands, wherein the cabin control panel is operable to control a plurality of passenger cabin systems in response to a received control command, and wherein the cabin control panel is further configured to communicate with the plurality of seat status indicators; and
a controller comprising a wireless data interface in communication with the cabin control panel, and logic that provides an Application Program Interface (API) for receiving mobile control commands formatted according to a first format from a mobile device and, in response, to determine corresponding control commands formatted according to a second format and to transmit the corresponding control commands to the cabin control panel, wherein the cabin control panel is operable to control the plurality of passenger cabin systems in response to a received control command, and wherein the mobile control command includes an indication of a position of a seat within the passenger cabin that is associated with one of the plurality of seat status indicators that changed from a first state to a second state, wherein the mobile device outputs a graphical user interface depicting the indication of the position of the seat within the passenger cabin.

2. The aircraft of claim 1, wherein the plurality of passenger cabin systems comprises a lighting system for the passenger cabin, and wherein the mobile control commands control at least one of a brightness of lighting of the lighting system, changes in brightness of the lighting system, color of the lighting system, and regions of the lighting system in which the lighting is turned on.

3. The aircraft of claim 1, wherein the plurality of passenger cabin systems comprises an environmental control system for the passenger cabin, and wherein the mobile control commands control at least one of an air temperature request for the passenger cabin and an airflow request for the passenger cabin.

4. The aircraft of claim 1, wherein the plurality of passenger cabin systems comprises an entertainment system for the passenger cabin, and wherein the mobile control commands control at least one of activation of the entertainment system, playback of media through the entertainment system, and selection of media for playback through the entertainment system.

5. The aircraft of claim 1, wherein the plurality of passenger cabin systems comprises an internet service for the passenger cabin, and wherein the mobile control commands control activation of the internet service.

6. The aircraft of claim 1, wherein the cabin control panel includes a status indicator operable to display an indication of a status of a system, and wherein the wireless data interface is operable to transmit the indication for display on the mobile device.

7. The aircraft of claim 6, wherein the system comprises at least one of:
a potable water holding tank, wherein the status indicator is a tank fill level indicator, and wherein the indication of the status of the potable water holding tank comprises a fill level of the potable water holding tank;
a lavatory waste tank, wherein the status indicator is a waste tank fill level indicator, and wherein the indication of the status of the lavatory waste tank comprises a fill level of the lavatory waste tank;
a lighting system for the passenger cabin, wherein the status indicator is a brightness level, and wherein the indication of the status of the lighting system comprises a brightness level; and
an environmental control system for the passenger cabin, wherein the status indicator is at least one of a current air temperature indicator and a requested air temperature indicator, and wherein the indication of the status of the climate control system comprises at least one of a current air temperature and a requested air temperature.

8. The aircraft of claim 1, further comprising attendant call buttons arranged in the passenger cabin, wherein the attendant call buttons are in communication with the cabin control panel, and wherein the wireless data interface transmits a notification to the mobile device upon an attendant call button being pushed.

9. The aircraft of claim 1, wherein the seat status indicators are attendant call buttons, and wherein the first state of the attendant call button is an inactive state and wherein the second state of the attendant call button is an active state.

10. The aircraft of claim 1, wherein the mobile control commands each comprise an 8 bit value that corresponds to a respective one of a plurality of cabin control panel control commands, wherein at least one unique permutation of the 8 bit value is not assigned to any cabin control panel control command, and wherein the API provides an interface through which the at least one unique permutation of the 8 bit value can be subsequently assigned to a cabin control panel control command.

11. A mobile control device for providing control commands to a control panel for a plurality of passenger cabin systems in a vehicle passenger cabin, wherein the vehicle passenger cabin includes a plurality of passenger seats and a plurality of seat status indicators, the mobile control device comprising:
   a wireless data interface operable to communicate with a control panel for the vehicle passenger cabin;
   a display screen operable to display data received from the control panel via the wireless data interface, wherein the display screen is further configured to display a graphical user interface depicting a position of each of a plurality of passenger seats and depicting at least one location of a seat within the vehicle passenger cabin associated with a particular seat status indicator that changed from a first state to a second state;
   a user interface operable to receive user selections; and
   control logic operable to monitor inputs to the user interface and to determine a control commands to transmit over the wireless data interface to the control panel, based on user selections at locations within the user interface, wherein the control commands comprise a fixed length string of bits that uniquely identifies a command for the control panel to execute, and wherein the control panel provides an interface through which at least one fixed length string of bits can be subsequently assigned to a control command.

12. The mobile control device of claim 11, wherein the user interface is operable to receive lighting control commands to change a brightness of lighting in the vehicle passenger cabin, and wherein the wireless data interface transmits the lighting control commands to the control panel.

13. The mobile device of claim 11, wherein the user interface is operable to receive temperature control commands to change an air temperature in the vehicle passenger cabin, and wherein the wireless data interface transmits the temperature control commands to the control panel.

14. The mobile device of claim 11, wherein the user interface is operable to receive media playback control commands to control playback of media through an entertainment system, and wherein the wireless data interface transmits the media playback control commands to the control panel.

15. The mobile device of claim 11, wherein the user interface is operable to receive internet service control commands, and wherein the wireless data interface transmits the internet service commands to the control panel.

16. The mobile device of claim 11, wherein the wireless data interface receives system status data from the control panel, and wherein the display screen displays the system status data.

17. The mobile device of claim 16, wherein the system status data relates to at least one of:
   a tank fill level for a potable water holding tank;
   a waste tank fill level for a lavatory waste tank;
   a brightness level of a lighting system for the passenger cabin; and
   at least one of a current air temperature indicator and a requested air temperature indicator for an environmental control system for the passenger cabin.

18. The mobile device of claim 11, wherein the wireless data interface receives data related to an attendant call button activation that includes a location of the attendant call button that was activated, and wherein the display screen displays an indication of the location.

19. A vehicle passenger cabin control system for a vehicle passenger cabin, wherein the vehicle passenger cabin includes a plurality of passenger seats and a plurality of seat status indicators, the vehicle passenger cabin control system comprising:
   a cabin control panel that includes an interface that is operable to receive control commands, wherein the cabin control panel is operable to control a plurality of passenger cabin systems in response to a received control command, wherein the cabin control system includes a first wireless data interface;
   a mobile device that includes a display screen, a user interface operable to receive control commands, and a second wireless data interface; and
   a controller in communication with the cabin control panel and the mobile device, wherein the controller provides an Application Program Interface (API) that exposes one or more functions, wherein control commands received by the user interface of the mobile device and formatted according to a first format are transmitted to the controller using the second wireless data interface, and wherein the controller is configured to generate corresponding control commands formatted according to a second format and to transmit the generated control commands to the cabin control panel using the first wireless data interface, wherein the cabin control panel is operable to control the plurality of passenger cabin systems in response to received control commands, and wherein at least one of the mobile control commands includes passenger seats information specifying a position of a seat within a vehicle passenger cabin having a particular seat status indicator that changed from a first state to a second state.

20. The vehicle passenger cabin control system of claim 19, wherein the plurality of passenger cabin systems comprises at least one of:
   a lighting system for the passenger cabin, and wherein the mobile control command includes a command to change a brightness of light output by the lighting system;
   an environmental control system for the passenger cabin, and wherein the mobile control command includes a command to change an air temperature in the passenger cabin;
   an entertainment system for the passenger cabin, wherein the mobile control command includes a command to one of play, pause, or change media for playback via the entertainment system; and
   an internet service system, wherein the mobile control command includes a command to activate the internet service system.

21. The vehicle passenger cabin control system of claim 19, wherein the plurality of passenger cabin systems comprises at least one of:
   a potable water holding tank, wherein the status indication is a potable water holding tank fill level;
   a lavatory waste tank, wherein the status indicator is a lavatory waste tank fill level;
   a lighting system for the passenger cabin, wherein the status indicator is a brightness level; and an environmental control system for the passenger cabin, wherein the status indicator is at least one of a current air temperature indicator and a requested air temperature indicator.

22. A system for an aircraft passenger cabin, wherein the aircraft passenger cabin includes a plurality of passenger seats and a plurality of seat status indicators, the system comprising:
- a cabin control panel that exposes an interface that is operable to receive control commands over a first wireless data interface, wherein the cabin control panel is operable to control a plurality of passenger cabin systems in response to a received control command;
- a mobile device that includes a display screen and computer program code that, when executed, receives control commands over a second wireless data interface and generates a graphical user interface for use in controlling the cabin control panel, wherein the graphical user interface includes a plurality of status indicators corresponding to the plurality of passenger cabin systems, and wherein the graphical user interface is output using the display screen; and
- a controller in communication with the cabin control panel and the mobile device, wherein the controller provides an Application Program Interface (API) that exposes one or more functions for:
    - receiving mobile control commands, from the second wireless data interface of the mobile device, formatted according to a first format, wherein the computer program code on the mobile device is configured to, in response to a selection of one of the plurality of status indicators, determine a fixed length string of bits that corresponds to a determined action for the selected status indicator and to transmit a mobile control command specifying the determined fixed length string of bits;
    - in response to receiving the mobile control commands, generating control commands formatted according to a second format that is distinct from the first format, wherein each of the generated control commands corresponds to a respective one of the mobile device commands, and wherein a first one of the control commands is generated by accessing a mapping of control commands in the first format to control commands in the second format, wherein at least one unique permutation of the fixed length string of bits is not assigned to any control command for the cabin control panel, and wherein the controller provides an interface through which the at least one unique permutation of the fixed length string of bits can be subsequently assigned to a control command for the cabin control panel;
    - transmitting the generated control commands to the exposed interface of the cabin control panel;
    - periodically querying the cabin control panel for status information describing a current state of the plurality of passenger cabin systems, and
    - upon receiving the status information from the cabin control panel, transmitting the status information to the mobile device, wherein the computer program code on the mobile device is configured to update the graphical user interface to depict a real-time status of the plurality of passenger cabin systems, using the status information.

* * * * *